ID 
US011921883B2

(12) United States Patent
Alsina et al.

(10) Patent No.: US 11,921,883 B2
(45) Date of Patent: **\*Mar. 5, 2024**

(54) CONTACT DISCOVERY SERVICE WITH PRIVACY ASPECT

(71) Applicant: Apple Inc., Cupertino, CA (US)

(72) Inventors: Thomas Alsina, Saratoga, CA (US); Joseph A. Tyson, Redwood City, CA (US); David K. Heller, Los Altos, CA (US); James M. Costello, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 17/202,263

(22) Filed: Mar. 15, 2021

(65) Prior Publication Data
US 2021/0224420 A1 Jul. 22, 2021

Related U.S. Application Data

(63) Continuation of application No. 16/137,392, filed on Sep. 20, 2018, now Pat. No. 10,949,564.
(Continued)

(51) Int. Cl.
*G06F 21/62* (2013.01)
*G06F 16/27* (2019.01)
(Continued)

(52) U.S. Cl.
CPC .......... *G06F 21/6245* (2013.01); *G06F 16/27* (2019.01); *G06F 21/602* (2013.01);
(Continued)

(58) Field of Classification Search
CPC .... G06F 21/6245; G06F 16/27; G06F 21/602; H04L 9/0643; H04L 9/0866;
(Continued)

(56) References Cited

U.S. PATENT DOCUMENTS 8,909,707 B2 12/2014 Sacks et al.
9,183,291 B2 * 11/2015 Brown .................... G06F 16/36
(Continued)

FOREIGN PATENT DOCUMENTS

CN  1505309 A  6/2004
CN  101394403 A  3/2009
(Continued)

OTHER PUBLICATIONS

Innovation Q Plus, NPL Search (Year: 2023).*
(Continued)

*Primary Examiner* — Mahfuzur Rahman
*Assistant Examiner* — Richard W Cruz-Franqui
(74) *Attorney, Agent, or Firm* — DICKINSON WRIGHT RLLP

(57) ABSTRACT

This application relates to a client-server architecture that enables user accounts registered with a service to be discoverable to other users of the service. A discovery protocol includes accessing personal information data stored in an address book of a client device, obfuscating the personal information data, transmitting a request to a service to determine if the obfuscated personal information data matches any potential contacts that have registered as discoverable with the service, and comparing information related to the potential contacts with the contacts included in the address book to determine if the contacts in the address book match any of the potential contacts.

20 Claims, 10 Drawing Sheets

Related U.S. Application Data

(60) Provisional application No. 62/668,173, filed on May 7, 2018.

(51) Int. Cl.
   *G06F 21/60* (2013.01)
   *H04L 9/06* (2006.01)
   *H04L 9/08* (2006.01)
   *H04L 9/32* (2006.01)
   *H04L 61/4594* (2022.01)
   *H04L 67/01* (2022.01)
   *H04L 67/10* (2022.01)

(52) U.S. Cl.
   CPC .......... *H04L 9/0643* (2013.01); *H04L 9/0866* (2013.01); *H04L 9/3242* (2013.01); *H04L 9/3263* (2013.01); *H04L 61/4594* (2022.05); *H04L 67/01* (2022.05); *H04L 67/10* (2013.01)

(58) Field of Classification Search
   CPC . H04L 9/3242; H04L 9/3263; H04L 61/4594; H04L 67/01; H04L 67/10
   See application file for complete search history.

(56) References Cited

U.S. PATENT DOCUMENTS

| | | | |
|---|---|---|---|
| 9,582,643 B2 * | 2/2017 | Keen | G06F 16/22 |
| 9,603,171 B2 * | 3/2017 | Luft | H04W 76/10 |
| 2004/0098609 A1 | 5/2004 | Bracewell et al. | |
| 2004/0148506 A1 | 7/2004 | Prince | |
| 2004/0236694 A1 * | 11/2004 | Tattan | G06Q 20/027 705/50 |
| 2005/0044059 A1 | 2/2005 | Samar | |
| 2009/0083439 A1 | 3/2009 | Matsuda | |
| 2009/0183008 A1 * | 7/2009 | Jobmann | G06F 21/34 235/382 |
| 2010/0235525 A1 * | 9/2010 | McGuire | H04L 61/4541 709/228 |
| 2011/0113029 A1 | 5/2011 | Kaal | |
| 2011/0295721 A1 * | 12/2011 | MacDonald | G06Q 30/0641 709/206 |
| 2012/0278633 A1 * | 11/2012 | Frieder | G06F 21/6245 713/189 |
| 2012/0311036 A1 | 12/2012 | Huhn | |
| 2013/0318347 A1 * | 11/2013 | Moffat | H04L 63/0435 713/168 |
| 2014/0006517 A1 | 1/2014 | Hsiao et al. | |
| 2014/0089412 A1 | 3/2014 | Patvarczki et al. | |
| 2014/0150086 A1 * | 5/2014 | Horst | G06Q 20/38215 726/18 |
| 2015/0281154 A1 | 10/2015 | Prince | |
| 2015/0318998 A1 * | 11/2015 | Erlikhman | H04L 63/0853 713/171 |
| 2015/0347784 A1 * | 12/2015 | Keen | G16H 10/60 726/28 |
| 2016/0004884 A1 * | 1/2016 | De Atley | H04L 63/062 726/30 |
| 2016/0034692 A1 * | 2/2016 | Singler | H04L 67/1095 726/26 |
| 2016/0099950 A1 | 4/2016 | Cuff et al. | |
| 2016/0112369 A1 | 4/2016 | Boodaei | |
| 2017/0048066 A1 * | 2/2017 | De Atley | H04L 63/0442 |
| 2017/0147757 A1 * | 5/2017 | Keen | H04L 67/12 |
| 2017/0161746 A1 * | 6/2017 | Cook | H04L 9/14 |
| 2017/0235971 A1 * | 8/2017 | Kline | G16H 10/60 713/193 |
| 2018/0159833 A1 * | 6/2018 | Zhang | H04L 9/3297 |
| 2018/0218168 A1 * | 8/2018 | Goel | G06F 21/6245 |
| 2019/0138326 A1 | 5/2019 | Horst et al. | |
| 2020/0106611 A1 * | 4/2020 | Bharatam | H04L 9/0844 |
| 2021/0326594 A1 * | 10/2021 | Costello | G06V 20/35 |
| 2022/0277099 A1 * | 9/2022 | Lahav | H04L 9/0825 |
| 2022/0300643 A1 * | 9/2022 | Madhavapeddi | G06F 21/604 |
| 2023/0050222 A1 * | 2/2023 | Wang | H04L 63/0807 |

FOREIGN PATENT DOCUMENTS

| | | | |
|---|---|---|---|
| CN | 105164689 A | | 12/2015 |
| EP | 2506177 A1 | | 10/2012 |

OTHER PUBLICATIONS

17202263 InnovationQ+ NPL Search (Year: 2023).*
Chinese Patent Application No. 201980030978.3—First Office Action dated Oct. 21, 2022.
International Patent Application No. PCT/US2019/027063—International Search Report and Written Opinion dated Aug. 7, 2019.
NPL Search "personal (information OR data) identifier key payload," (Google Scholar) (Year: 2020).
European Patent Application 19798897.5—Extended European Search Report dated Dec. 23, 2021.
European Patent Application 19798897.5—First communication pursuant to Art. 94(3) EPC dated Jan. 23, 2024.

* cited by examiner

CONTACT DISCOVERY SERVICE WITH PRIVACY ASPECT

CROSS-REFERENCE TO RELATED APPLICATIONS

The present application is a continuation of U.S. application Ser. No. 16/137,392, entitled "CONTACT DISCOVERY SERVICE WITH PRIVACY ASPECT," filed Sep. 20, 2018, set to issue Mar. 16, 2021 as U.S. Pat. No. 10,949,564, which claims the benefit of U.S. Provisional Application No. 62/668,173, entitled "CONTACT DISCOVERY SERVICE WITH PRIVACY ASPECT," filed May 7, 2018, the contents of all of which are incorporated by reference herein in their entirety for all purposes.

FIELD

The described embodiments relate generally to handling of private information data. More particularly, the present embodiments relate to discovering contacts associated with a user of a client application using private information data read from an address book on a client device while maintaining confidentiality of the private information data in the address book.

BACKGROUND

Mobile devices such as cellular phones and tablets commonly store an address book that includes information for various contacts known to a user of the mobile device. The address book typically stores a contact's name along with at least one of a phone number or an email address for the contact. Additional information related to the contact, such as a residential address or image may also be stored in the address book.

Many applications would like to leverage this personal information data to implement a social aspect of the application. For example, a game application could read email addresses from the address book to determine whether additional user accounts may be related to a particular user based on matching email addresses in the address book with email addresses registered with the user accounts.

Notably, these applications are typically designed to request access to the address book such that the application can leverage the information contained therein. However, there are commonly very few limits placed on how the application can use this personal information data once access has been granted. Many users are uncomfortable with allowing such unrestricted access to the information they have in their address book. Consequently, such users may instead choose to deny the application access to the information in the address book entirely, which impedes the ability of the application to provide said social aspect as a part of the overall user experience of the application.

SUMMARY

This paper describes various embodiments that relate to a client-server architecture that enables user accounts registered with a service to be discoverable to other users of the service. A discovery protocol includes accessing personal information data stored in an address book of a client device, obfuscating the personal information data, transmitting a request to a service to determine if the obfuscated personal information data matches any potential contacts that have registered as discoverable with the service, and comparing information related to the potential contacts with the contacts included in the address book to determine if the contacts in the address book match any of the potential contacts.

In some embodiments, a client device is configured to access personal information data related to one or more contacts stored in an address book of the client device. The client device is configured to generate an identifier corresponding to an item of personal information data for a contact in the one or more contacts, and generate a hash value for the item of personal information data for the contact. The client device is configured to transmit a request that includes the identifier and a truncated portion of the hash value to a service. The client device receives at least one response to the request, each response including the identifier and a payload that has been encrypted utilizing a hash value associated with a potential contact as an encryption key. The client device is configured to attempt to decrypt the payload utilizing the hash value for the item of personal information data for the contact as a decryption key.

In some embodiments, the service is configured to match the truncated portion of the hash value to zero or more potential contacts stored in a database that are registered with the service as discoverable and associated with the truncated portion of the hash value. The potential contact matches the contact in the address book when a decrypted version of the payload includes information associated with a user account for the potential contact in a recognized format. The potential contact does not match the contact in the address book when the decrypted version of the payload is not in the recognized format. In such cases, the response including the payload can be discarded by the client device.

In some embodiments, the item of personal information data comprises a phone number or an email address. The item of PID can be normalized prior to generating the corresponding hash value. The hash value is encoded as M bits. In some embodiments, the hash value is a 256-bit value generated utilizing a SHA-256 secure hash algorithm. In some embodiments, a number of bits included in the truncated portion of the hash value is adjusted dynamically based on a total number of potential contacts registered with the service.

In some embodiments, the service maintains a distributed database that includes key-value pairs that associate a key with zero or more potential contacts registered with the service. In some embodiments, the key corresponds to the N most significant bits of hash values associated with the zero or more potential contacts. In some embodiments, the encrypted payload is pre-defined for each potential contact and stored in the distributed database. In some embodiments, the information included in the encrypted payload includes at least one of: a name of the potential contact; an identifier for a user account associated with the potential contact; a thumbnail image of the potential contact; a universal resource locator (URL) for a location of an image of the potential contact; or a URL for a location of a profile for the potential contact.

In some embodiments, the request is signed using a certificate associated with at least one of the service or the client device. The response can also be signed using a certificate associated with at least one of the service or the client device.

In some embodiments, the discovery protocol is implemented by a client application included in the client device. The client application can be a music sharing application, and the service is configured to provide music content to the client device via a network. In some embodiments, the client application is configured to display information related to the potential contact included in the payload.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
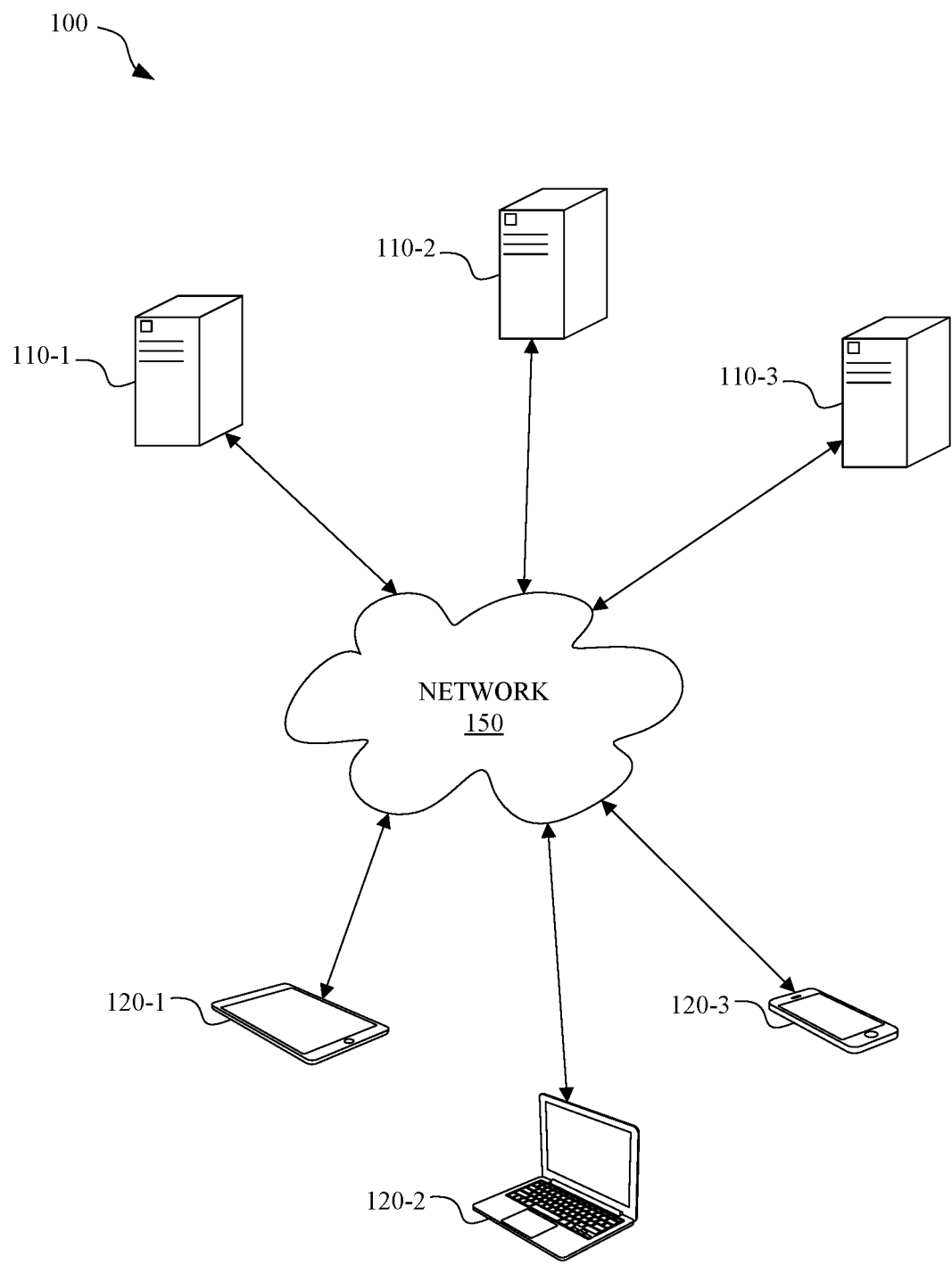
FIG. 1 illustrates a client-server architecture, in accordance with some embodiments.

Representative implementations of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A technique for discovering whether any contacts in an address book of a client device are associated with user accounts that have been registered with a service as discoverable is described in more detail below. The techniques described herein obfuscate the personal information data included in the address book such that the personal information data remains confidential and is not shared outside of the client device. Nevertheless, a contact discovery service can provide a number of potential contacts to a client device that match the obfuscated information such that the client device can determine whether any of these potential contacts match any of the contacts stored locally on the client device within the address book.

In some embodiments, a discovery protocol is implemented by a client application and a contact discovery service. The contact discovery service maintains a database that includes information related to a number of user accounts that have been registered with a service as discoverable to other users. The client application parses the data for one or more contacts in the address book to identify personal information data such as phone numbers or email addresses for the one or more contacts. The personal information data can then be compared to corresponding personal information data for potential contacts in the database.

The discovery protocol maintains the confidentiality of the personal information data by hashing the personal information data. Furthermore, only a portion of the hash values are shared between the client device and the contact discovery service. The truncated portion of the hash value sent to the contact discovery service can match multiple potential contacts at the contact discovery service. Once the information for the potential contacts are returned to the client device in one or more responses, the client device can quickly compare the full hash value known by the client device to a number of responses received from the contact discovery service in order to determine which responses may be relevant.

In some embodiments, the contact discovery service encrypts the payload in a response utilizing a hash value of personal information data related to a potential contact in the database as an encryption key. The client device then determines if the contact in the address book matches the potential contact by attempting to decrypt the payload utilizing the full hash value of the personal information data for the contact in the address book as a decryption key. The decryption operation is only successful if the hash value for the personal information data for the contact in the address book of the client device matches the hash value for the personal information data for the potential contact registered with the service, thereby indicating a match between the contact in the address book and the potential contact registered as discoverable with the service.

Personal information data can refer to phone numbers or email addresses of contacts. However, other types of personal information data can also be used within the discovery protocol such as street addresses, usernames for user accounts, user identifiers, and the like.

In some embodiments, the client application is a music sharing application and the service is a music sharing service. The discovery protocol is utilized to determine whether any of the contacts stored in an address book of the client device are registered with the music sharing service and have made their user accounts discoverable to other users of the music sharing service. The client application can incorporate a social aspect into the user experience for the music sharing service by, e.g., indicating music that other known users (e.g., friends) are listening to or have recommended. Similarly, the client application can enable a user to register his/her user account with the music sharing service as discoverable such that other users can see the music that user is listening to or has recommended. Other social aspects can also be incorporated into the music sharing service, such as sharing information related to concerts various users might be planning to attend, sharing information related to user profiles to make recommendations of music that might be preferred by contacts of a given user, and so forth. It will be appreciated that the discovery protocol can be implemented by other types of services other than a music sharing service and that the types of services described herein, including the music sharing service, should not be construed as limiting.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a client-server architecture 100, in accordance with some embodiments. The client-server architecture 100 includes a number of separate and distinct computing devices configured to communicate over a network 150. The client-server architecture 100 includes server devices 110 and client devices 120. As depicted in FIG. 1, the client devices 120 can include, but are not limited to, a tablet computer 120-1, a laptop computer 120-2, and a mobile device 120-3. It will be appreciated that the client-server architecture 100 can include other types of client devices 120 such as desktop computers, wearable devices (e.g., smart watches), personal digital assistants, and the like.

In some embodiments, a client device 120 includes one or more applications configured to be executed by a processor of the client device 120. The applications can include an operating system that provides an operating environment for one or more additional applications. At least one application on the client device 120 can be a client application that is configured to interact with a service implemented by one or more server devices 110. Examples of a client application may include an e-commerce application, a music sharing application, a fitness application, and the like. Three server devices 110-1, 110-2, and 110-3 are depicted in FIG. 1, although it will be appreciated that fewer or greater numbers of server devices 110 can be included in the client-server architecture 100.

In some embodiments, a first server device 110-1 operates as a gateway device for one or more additional server devices, such as server devices 110-2 and 110-3. In such embodiments, the client devices 120 can send requests to the first server device 110-2, which forwards the requests to the appropriate back-end server device 110-2 or 110-3 for processing.

In some embodiments, at least one server device 110 hosts one or more services utilized by the applications included on the various client devices 120. For example, the second server device 110-2 can host a service for registering user accounts that have opted-in to allow the user account to be discoverable to other users. As another example, the third server device 110-3 can host a service that processes contact discovery requests from various client applications. In some embodiments, services utilized by the application(s) can be hosted on more than one server device 110.

Figure 2:
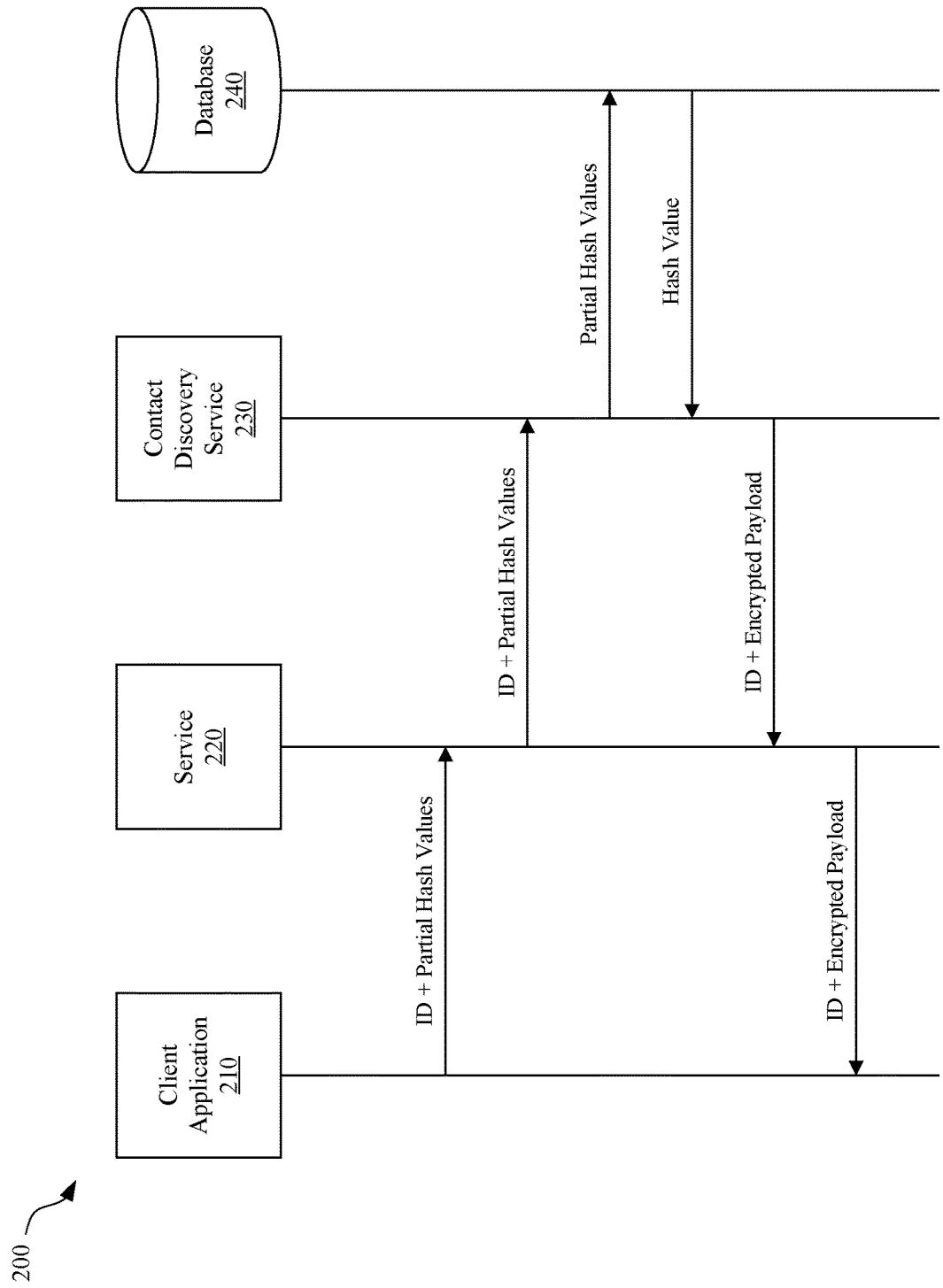
FIG. 2 is a conceptual view of a discovery protocol, in accordance with some embodiments.

FIG. 2 is a conceptual view of a discovery protocol 200, in accordance with some embodiments. The discovery protocol is implemented by a plurality of software components executed on a client device 120 and one or more server devices 110. As depicted in FIG. 2, the software components can include a client application 210, a service 220, a contact discovery service 230, and a database 240. The client application 210 can be included in at least one memory of a client device 120 and executed by at least one processor of the client device 120. The service 220, the contact discovery service 230, and the database 240 can be included in at least one memory of one or more server devices 110 and executed by at least one processor of the server devices 110.

In some embodiments, the client application 210 is a software component that is configured, at least in part, to utilize the service 220. The client application 210 can be configured to perform various operations. For example, the client application 210 can be an application for listening, downloading, and/or purchasing music (e.g., audio files) provided through a network-based connection with the service 220.

In some embodiments, the client application 210 is a web-based application displayed within a browser of a client device 120. The client application 210 can include a series of resources (e.g., hypertext markup language (HTML) documents, images, scripts, etc.) requested from a server associated with a website. The browser receives the resources and interprets the resources to display a representation of the website on a display of the client device 120. The client application 210 is therefore platform-independent in that the client application 210 can be displayed on a plurality of different client devices 120 running different operating systems.

In some embodiments, the service 220 enables the client application 210 to access resources managed by the service 220. The service 220 can implement an application programming interface (API) that can be utilized by the client application 210 to interact with the service 220. For example, a web-based service can implement an API using a simple object access protocol (SOAP) or a representational state transfer protocol (REST) that enables the client application 210 to access and/or operate on resources associated with the service 220. The API can enable the client application 210 to transmit data to and/or receive data from the service 220. API calls can also cause the service 220 to perform various operations and/or call additional back-end services using additional API calls.

In some embodiments, the client application 210 includes a graphical user interface (GUI) presented on a display of the client device 120. The GUI can enable a user of the client application 210 to perform various functions, including creating a user account for the service 220, registering the user account as discoverable to other users, discovering other user accounts registered with the service 220, and the like.

In some embodiments, users of the client application 210 can create a user account with the service 220. The service 220 can create a user identifier for each user account that is registered with the service 220. The user identifier can also be associated with a device token for the client device 120 such that the service 220 can associate the user identifier for the service 220 with a specific instance of the client application 210 executed on the client device 120. In some embodiments, the user identifier can be associated with multiple device tokens for multiple client devices 120 such that the same user identifier is associated with multiple instances of the client application 210 executed on different client devices 120.

In some embodiments, the service 220 can utilize a back-end service referred to as a contact discovery service 230 to register user identifiers for user accounts that have opted-in to make their contact information discoverable by other users of the service 220. In such embodiments, the contact discovery service 230 maintains a database 240 that associates keys with the user identifiers for various user accounts that have registered as discoverable. In some embodiments, the keys can be derived from personal information data related to a user of the user account. The personal information data can be a phone number associated with the user or an email address associated with the user. The phone number and/or email address can be registered to the user account when the user account is created. In some embodiments, the phone number and/or email address can be verified, such as by sending a text with a code to the phone number or sending a confirmation email to the email address to confirm that a user for the user account maintains control of the phone number or email address.

The user identifier for a user account can also be associated with additional information within the database 240. For example, the user identifier can be associated with one or more device tokens for client devices 120, a hash value generated based on the personal information data, an encrypted data payload that includes information related to the user account, and the like. In other embodiments, the contact discovery service 230 can store this additional information in separate databases utilizing the user identifier for the user account as a key to access this additional information.

The software components depicted in FIG. 2 can be utilized to implement a discovery protocol 200 that enables a client application 210 to identify other user accounts registered with the service 220 based on contact information included within an address book stored in the client device 120. One problem with conventional protocols for providing users with a list of other users that may be known to the user is that personal information data is likely to be exchanged between a client application and a service. Many users are uncomfortable with sharing such personal information data about themselves or their contacts. Consequently, the discovery protocol 200 takes steps to obfuscate the personal information data shared between the client application 210 and the service 220.

In some embodiments, the client application 210 is configured to access information related to one or more contacts that the user of the client device 120 has previously stored in an address book of the client device 120. The address book can refer to a local data store or data structure stored in a non-volatile memory of the client device 120. The address book can include entries related to different contacts. Each entry can include personal information data for a particular contact such as a contact's name, residential or business address, phone number(s), email address(es), birthdates, links to social media profiles, relationships to other contacts, and the like.

The address book can include a number of contacts, each contact associated with at least one phone number and/or at least one email address. The discovery protocol 200 attempts to utilize this personal information data to determine if any of the contacts included in the address book of the client device 120 have also registered a user account with the service 220 to make said user account discoverable to other users. Nevertheless, the client application 210 does not send the personal information data included in the address book to the service 220. This prevents the service 220 from learning the contents of the user's address book and prevents the service 220 from establishing relationships between users of the service and other users that have not registered a user account with the service 220 and subsequently opted-in to make said user account discoverable.

Notably, the client application 210 only provides an obfuscated view of the contents of the address book stored in the client device 120 to the service 220. For each contact in the address book, the client application 210 accesses the personal information data related to the contact, generates an identifier for the contact to track a request, and identifies an item of personal information data for the contact in the address book. Then, for a particular contact in the address book, the client application 210 can determine whether the particular contact has registered a user account with the service 220 as discoverable by transmitting a request to the service 220 that includes the identifier and a key derived from the item of personal information data for the particular contact.

In some embodiments, the key is derived from the item of personal information data by generating a hash value for the item of personal information data using a secure hash function. The key is then created by selecting a truncated portion of the hash value that comprises the N most significant bits of the hash value, where N is less than M bits of the full hash value. In other embodiments, the key is derived from the item of personal information data using a custom hash function that directly results in a hash value of N bits. The custom hash function can be dynamically changed to ensure privacy of the personal information data is maintained.

The service 220 forwards the request to the contact discovery service 230, which reads the key value to query the database 240, which, in response to the query, returns zero or more user identifiers for user accounts of potential contacts associated with that particular key value. In particular, a user identifier is associated with a key value in the request if corresponding personal information data for the potential contact corresponding to that user identifier is utilized to derive a key value utilized to index said user identifier in the database 240 that matches the key value in the request.

In some embodiments, the result of the query returns information related to zero or more potential contacts registered with the contact discovery service 230. The information for each potential contact can include a user identifier for the user account and a hash value corresponding to the potential contact that matches the key value included in the request. The contact discovery service 230 generates a payload to include in a response to the client application 210. The payload is based on the information related to the user account for a potential contact.

In some embodiments, the contact discovery service 230 gathers the information from available sources, including the database 240 and/or separate databases, writes the information to a data structure in a recognized format, and then encrypts the data structure using an encryption key associated with the potential contact to generate an encrypted payload for a response that is transmitted to the client application 210. The encryption key can be generated by hashing personal information data related to the potential contact utilizing a secure hash algorithm. In other embodiments, the encrypted payload is pre-defined and stored in the database 240.

In some embodiments, the payload can include at least one of: (1) a name of the potential contact; (2) an identifier for a user account associated with the potential contact; (3) a thumbnail image of the potential contact; (4) a universal resource locator (URL) for a location of an image of the potential contact; and/or (5) a URL for a location of a profile for the potential contact. The payload can include other information in addition to or in lieu of the information set forth above. For example, the payload could also include the personal information data for the potential contact, such as the email address or phone number of the potential contact.

The response, which includes the identifier included in the request and the encrypted payload, is transmitted from the contact discovery service 230 to the client application 210, either directly or indirectly through the service 220. The client application 210 can then attempt to decrypt the payload in the response using an encryption key calculated for the personal information data retrieved from the address book to determine if the contact in the address book matches the potential contact registered with the service 220.

In some embodiments, the requests transmitted from the client application 210 to the service 220, or forwarded between the service 220 and the contact discovery service 230, can be signed using a certificate that is associated with at least one of the service 220 or the client device 120. The certificate can be maintained by a certificate authority that is utilized to ensure the authenticity of the client application 210. In some embodiments, the responses transmitted from the contact discovery service 230 to the service 220, or forwarded between the service 220 and the client application 210, can also be signed using a certificate that is associated with at least one of the service 220 or the client device 120. The signed requests and/or responses can also be encrypted using a secure communication channel established between the client device 120 and a server device 110 or, alternately, between a first server device 110-1 and a second server device 110-2.

Although the discovery protocol 200 is illustrated as including the service 220 as a gateway between the client application 210 and the contact discovery service 230, in some embodiments, the service 220 can be omitted and the client application 210 can interface directly with the contact discovery service 230.

Figure 3:
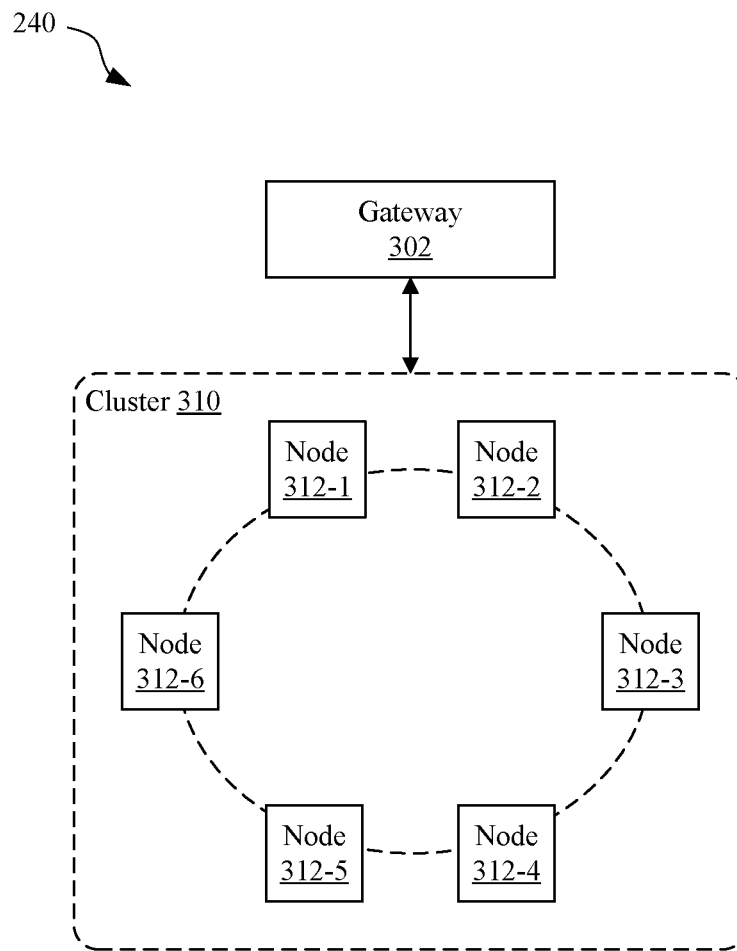
FIG. 3 illustrates a cluster of server nodes configured to maintain a distributed database of user accounts that have opted-in to be discoverable to other users, in accordance with some embodiments.

FIG. 3 illustrates a cluster 310 of server nodes 312 configured to maintain a distributed database 240 of user accounts that have opted-in to be discoverable to other users, in accordance with some embodiments. The database 240 is configured to maintain entries for each of the user accounts that have been registered as discoverable with the contact discovery service 230. When the database 240 reaches a threshold size, performance can begin to suffer as the number of entries becomes too large to query in an efficient manner. Therefore, the entries can be divided over a plurality of server nodes 312 in a cluster 310, with each server node 312 maintaining a portion of the total number of entries in the database 240.

In some embodiments, the database 240 is a distributed database—e.g., the Apache® Cassandra distributed database—that has been subdivided into a plurality of different portions of the database, which may be referred to as sharding. The database 240 is accessed via a gateway device 302, which is a server device 110 configured to redirect API calls received from the contact discovery service 230 to the various server nodes 312 in the server cluster 310 based on a key included in the API call. In other embodiments, the gateway device 302 is omitted or selectively bypassed and the contact discovery service 230 transmits API calls to the server cluster 310 directly. API calls can be received by any server node 312 in the cluster 310 and redirected to the correct server node 312 based on the key included in the API call.

In some embodiments, each server node 312 is a separate and distinct server device 110 communicatively coupled to the other server nodes 312 over the network 150. In other embodiments, each server node 312 is an instance of a virtual machine (VM) hosted on a server device 110, where multiple server nodes 312 can be executed on a single server device 110 that executes a hypervisor configured to manage multiple instances of the VM. Multiple server devices 110 can each implement a hypervisor and one or more VMs to implement the cluster 310.

In some embodiments, each entry added to the database 240 is a key-value pair. The key for the entry can be derived from a truncated portion of a hash value of an item of personal information data. The value for the entry includes at least a user identifier corresponding to a user account registered with the service 220. The value can also include a hash value of the personal information data associated with the user account, additional information related to the user account (e.g., a user name, a thumbnail or image associated with the user account, etc.), or an encrypted data payload.

It will be appreciated that the same user account can be associated with multiple entries in the database 240. In other words, the same user account can be associated with multiple items of personal information data that can be utilized to derive different key values utilized to index the user account in the database 240. For example, a first entry for a user account can be created that is based on a truncated portion of a hash value generated from a phone number associated with the user account. A second entry for the user account can be created that is based on a truncated portion of a hash value generated from an email address associated with the user account. Because the phone number and the email address are different items of personal information data, a hash function applied to the phone number and the email address is likely to yield different hash values for the different inputs to the hash function, which will lead to different key values for each of the phone number and the email address being used to index two different entries for the same user account in the database 240.

In some instances, even if the full hash values for two items of personal information data are different, the truncated portions of the hash values (e.g., the N most significant bits) can be the same, especially if N is very small. Consequently, two different entries for the same user account could be indexed into the database 240 using the same key value. In some embodiments, care can be taken when registering a user account using multiple items of personal information data to index the user account in the database 240 such that only one entry for the user account is added to the database for each distinct key value.

Figure 4:
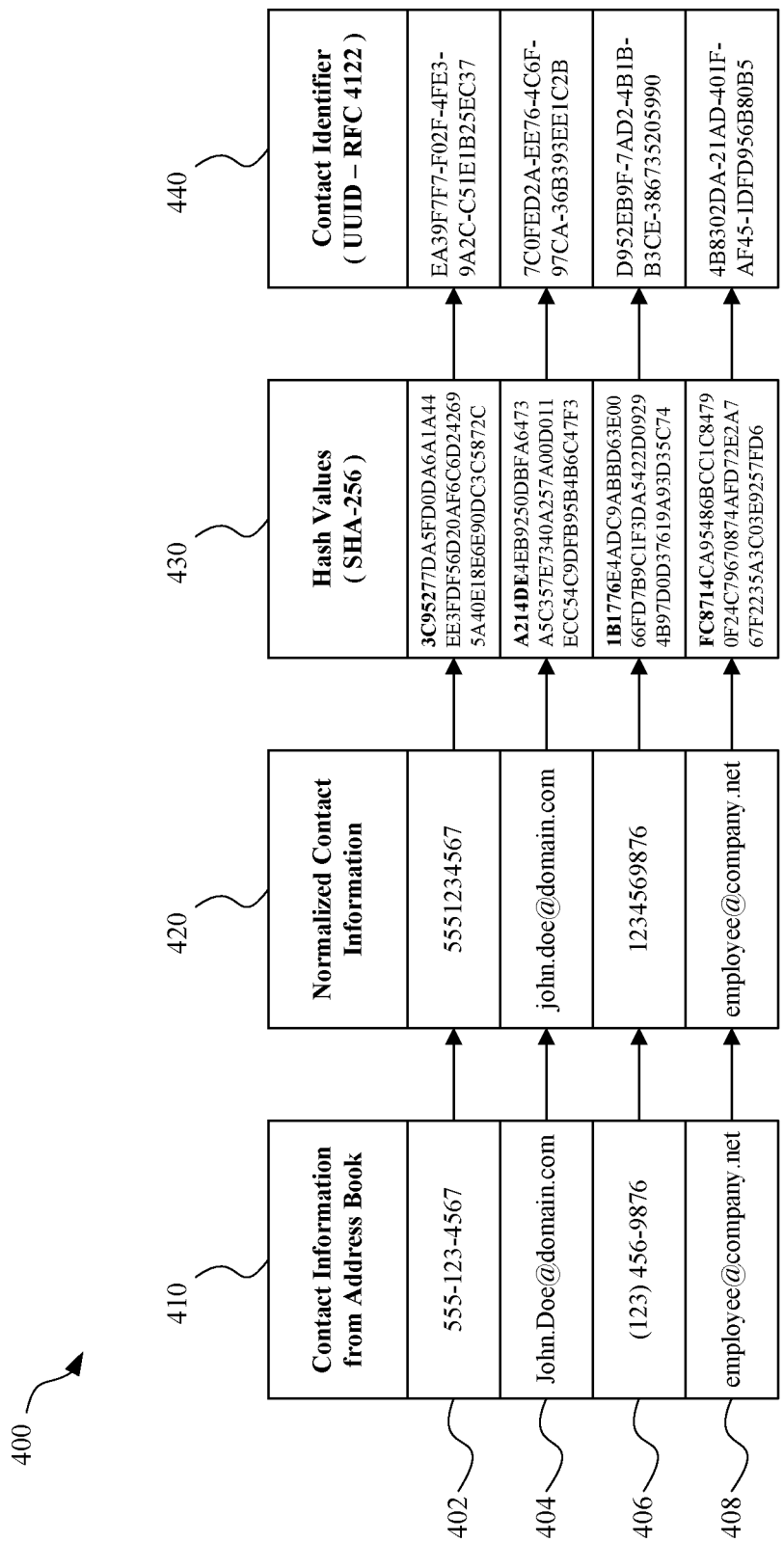
FIG. 4 illustrates a flow for processing personal information data collected from an address book, in accordance with some embodiments.

FIG. 4 illustrates a flow 400 for processing personal information data collected from an address book, in accordance with some embodiments. The flow 400 can be performed by the client application 210 executing within the client device 120. As depicted in FIG. 4, the address book can include personal information data for a number of contacts. The client application 210 reads the data stored within the address book to retrieve personal information data such as phone numbers and email addresses for one or more contacts. It will be appreciated that each contact can include zero or more phone numbers and zero or more email addresses associated with a name for the contact. The client application 210 can create a different contact information record (CIR) for each item of personal information data. It will be appreciated that multiple CIRs can be created for a single contact where multiple items of personal information data for the contact are stored in the address book. In some embodiments, the client application 210 only creates one CIR per contact, prioritizing certain personal information data over other personal information data when selecting an item of personal information data for the contact. For example, the client application 210 can prioritize a cell phone number over a home phone number over a business phone number, which are all prioritized over a personal email address and a work email address, as optionally stored in the address book. In some embodiments, the client application 210 creates one CIR for each type of personal information data, prioritizing certain personal information data over other personal information data of a particular type when selecting an item of personal information data for the contact. For example, the client application 210 will create one CIR for a phone number and one CIR for an email address, even if multiple phone numbers and/or multiple email addresses for a particular contact are stored in the address book.

As depicted in FIG. 4, the personal information data can include phone numbers and email addresses in different formats. The first step 410 of the flow 400 includes the client application 210 accessing the contact information in the address book. In some embodiments, the address book provides an API for accessing a data structure for each contact in the address book. The client application 210 can enumerate the contacts and create zero or more CIRs for each contact included in the address book. For example, a first CIR 402 is created for a phone number formatted as "555-123-4567", a second CIR 404 is created for an email address formatted as "John.Doe@domain.com", a third CIR 406 is created for a phone number formatted as "(123) 456-9876", and a fourth CIR 408 is created for a phone number formatted as "employee@company.net". It will be appreciated that the first CIR 402 and the second CIR 404 or the third CIR 406 and the fourth CIR 408 could be created for information contained in the same data structure for a single contact or different data structures for multiple contacts. For example, a data structure for a single contact could include both a phone number and an email address for the contact. In a similar fashion, the first CIR 402 and the third CIR 406 or the second CIR 404 and the fourth CIR 408 could also be created for information contained in the same data structure for a single contact or different data structures for multiple contacts. For example, a data structure for a single contact could include both a home phone number and a work phone number for the contact or a personal email address and a business email address for the contact. Alternately, a data structure for a single contact could only list one of a phone number or an email address for that contact, but not both a phone number and an email address. Some data structures for contacts may include neither a phone number nor an email address. In such cases, the client application 210 can move to the next data structure in the enumeration without creating a CIR.

The second step 420 in the flow 400 includes the client application 210 normalizing the personal information data parsed from the data structure for a contact. In some embodiments, the address book can store phone numbers or email addresses in varying formats. For example, the phone numbers can be stored as a string that includes special characters such as '(', ')', and/or '-' for formatting purposes to make the phone numbers easier to read. In some embodiments, the client application 210 normalizes phone numbers by removing any special characters and generating a string of characters limited only to the digits of the phone number. For example, the phone number in the first CIR 402 is normalized from "555-123-4567" to "5551234567", and the phone number in the third CIR 406 is normalized from "(123) 456-9876" to "1234569876". In some embodiments, the phone numbers will be normalized to include country codes and/or international exit codes for the phone number. Optionally, local phone numbers stored in the address book without the country code and/or international exit code can be appended with a default country code, such as "1" for the United States of America, and international exit code, such as 011 from the United States to a country outside of the North American Numbering Plan (NANP). Alternately, local phone numbers can be padded with leading zeros (or any other digit or set of digits) to ensure that all normalized phone numbers have the same number of characters in the character string.

In some embodiments, the client application 210 also normalizes email addresses by changing any upper case letters in the email addresses to lower case letters. For example, the email address in the second CIR 404 is normalized from "John.Doe@domain.com" to "john.doe@domain.com". The normalization of email addresses can keep special characters such as '@' and '.' in the normalized format because the special characters can reference two separate and distinct email addresses. In other embodiments, the special characters can be dropped during normalization. In yet other embodiments, Unicode characters can be converted to a canonical encoding such as non-combining, UTF-8 characters.

The third step 430 of the flow 400 includes the client application 210 generating a hash value for the normalized personal information data. In some embodiments, the client application 210 generates a 256-bit hash value for the normalized personal information data using the SHA-256 secure hash algorithm, which is well-known and defined in the Federal Information Processing Standards (FIPS) 180-4 Secure Hash Standard promoted by the National Institute of Standards and Technology (NIST), which is herein incorporated by reference in its entirety.

As depicted in FIG. 4, the normalized phone number in the first CIR 402 is hashed by the SHA-256 hash algorithm to generate a 256-bit hash value, in hexadecimal format, of: 0x3C95277DA5FD0DA6A1A44EE3FDF56D20AF6C6D 242695A40E18E6E90DC3C5872C In other embodiments, the length of the hash value can be greater than or less than 256-bits. For example, the hash value can be generated as a 384-bit hash value using the SHA3-384 secure hash algorithm. In addition to standard hashing algorithms, the client application 210 could implement a custom hashing algorithm to generate a hash value of a particular custom bit length. For example, a custom hashing algorithm could be defined that generates a hash value having N bits, where the value of N is selected in order to keep a number of expected collisions in the database 240 within a range that respects privacy of the personal information data.

The fourth step 440 of the flow 400 includes the client application 210 generating an identifier for the CIR that will be used to match responses to requests. In some embodiments, the client application 210 generates a universally unique identifier (UUID) based on the Uniform Resource Name (URN) namespace defined in the Request For Comments (RFC) 4122 standard proposed by the Network Working Group of the Internet Engineering Task Force (IETF), which is herein incorporated by reference in its entirety. The UUIDs generated based on the RFC 4122 standard are 128-bit values that are unique for a particular CIR, and therefore uniquely associated with a particular item of personal information data for a particular contact included in the address book.

As depicted in FIG. 4, the UUID generated for the first CIR 402 is given, in hexadecimal format (dashes are shown for formatting purposes only), as:

0xEA39F7F7-F02F-4FE3-9A2C-051E1B25EC37

The UUIDs are used by the client application 210 to reference a particular CIR for a particular contact without disclosing any additional details about the contact to a process external to the client device 120, such as service 220 or contact discovery service 230. In other embodiments, the identifiers do not have to be UUIDs as defined by RFC 4122 or any other standard, but should be unique within the scope of the discovery protocol for a particular client application 210 such that responses received from the service 220 or the contact discovery service 230 can be correlated with a particular contact in the address book.

Once the client application 210 has generated the hash value of the normalized personal information data and created an identifier for an item of personal information data for a contact in the address book, the client application 210 can generate a request to send to the service 220 to discover whether that contact is registered with the service 220 and has opted-in to be discoverable to other users.

In other embodiments, the process or background service executing within an operating environment of the client device 120 performs the flow 400 for processing personal information data collected from an address book. The process or background service implements an API for accessing the personal information data in the address book. The client application 210 is denied read access to the data in the address book, and can only access the personal information data in the address book indirectly through the API. The client application 210 can request the process or background service to generate an identifier for a contact, generate a hash value for a normalized item of personal information data for the contact, and provide the identifier and/or hash value to the client application 210. Thus, the client application 210, even on the client device 120, does not have access to the underlying personal information data until such data has been obfuscated by the secure hash algorithm.

Figure 5:
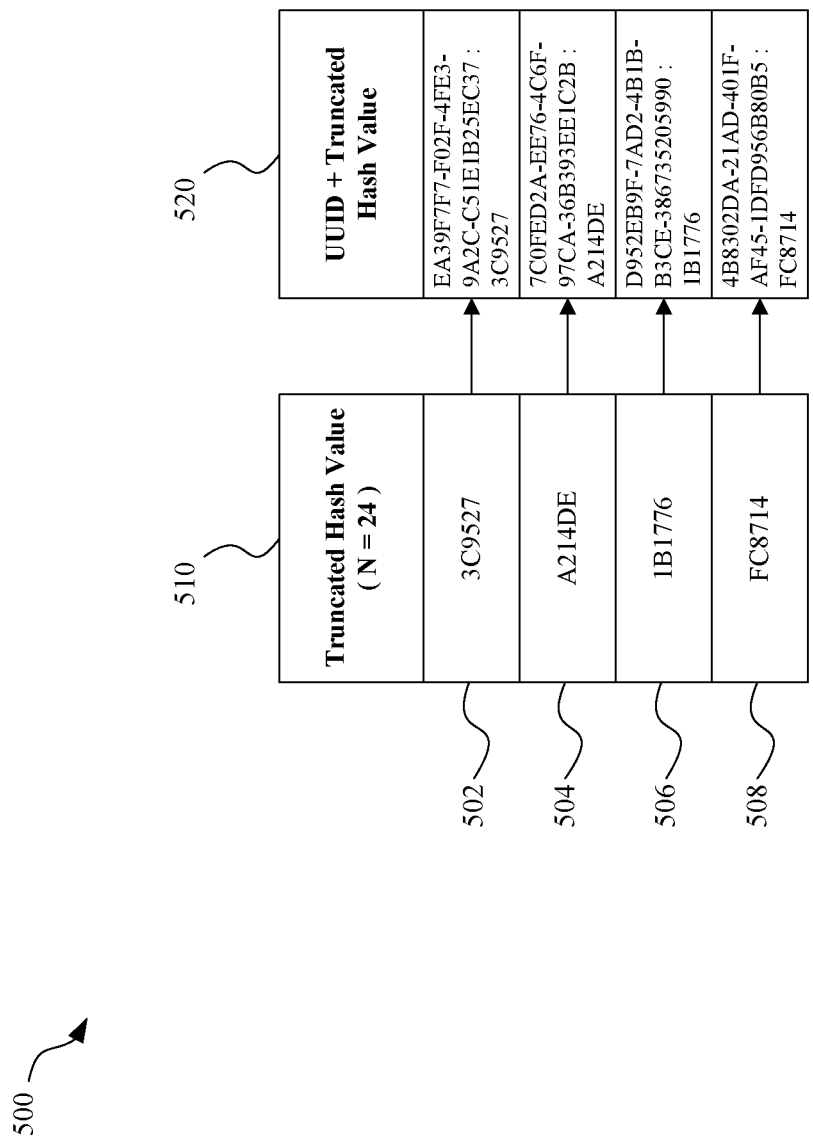
FIG. 5 illustrates a flow for generating a request to discover whether a user account for the contact is registered as discoverable with the service, in accordance with some embodiments.

FIG. 5 illustrates a flow 500 for generating a request to discover whether a user account for the contact is registered as discoverable with the service 220, in accordance with some embodiments. The flow 500 can be performed by the client application 210 executing within the client device 120. One important aspect of the discovery protocol 200 is that the client application 210 obfuscates the information from the address book such that the service 220 and/or the contact discovery service 230 are prevented from any view into the personal information data included in the address book.

The first step 510 of the flow 500 includes the client application 210 truncating the hash value for a CIR to generate a key value for a query of the database 240. In some embodiments, the truncated portion of the hash value refers to the N most significant bits of the 256-bit hash value. As one example, N can be set equal to 24 bits. It will be appreciated that N can be tailored to a number of bits that causes an expected number of collisions within the database 240. The total number of key values utilized to store entries related to contacts in the database 240 is equal to $2^N$. Given M entries related to contacts stored in the database 240, then the expected number of entries returned in response to a query of the database 240 utilizing a particular key value will be given as:

$$\frac{M}{2^N} \qquad \text{(Eq. 1)}$$

In some embodiments, a number of bits included in the truncated portion of the hash value is adjusted dynamically based on a total number of potential contacts registered with the service. The value of N can be increased to maintain the expected number of entries returned in response to a random query within a specific range (e.g., between 1 and 4 entries). In some embodiments, the contact discovery service 230 sets the value of N and transmits the value of N to the client application 210 such that the requests received from the client application 210 will include keys of the correct bit width.

As depicted in FIG. 5, a key for a request is created by truncating the hash value from a CIR to the N most significant bits. For example, a key for a first request 502 is created by truncating the hash value from the first CIR 402 to 24-bits (e.g., 0x3C9527 in hexadecimal format), a key for a second request 504 is created by truncating the hash value from the second CIR 404 to 24-bits (e.g., 0xA214DE in hexadecimal format), a key for a third request 506 is created by truncating the hash value from the third CIR 406 to 24-bits (e.g., 0x1B1776 in hexadecimal format), and a key for a fourth request 508 is created by truncating the hash value from the fourth CIR 408 to 24-bits (e.g., 0xFC8714 in hexadecimal format).

In some embodiments, the hash value is truncated in increments of 4 bits such that the hash value, in hexadecimal format, is truncated directly in hexadecimal format. In other embodiments, the hash value is converted from hexadecimal format to a binary format and the hash value is truncated to any bit length. The truncated hash value is then padded with leading zeros to a length that is divisible by 4 and converted back to a hexadecimal format.

In some embodiments, the key value is derived using a keyed-hash message authentication code (HMAC). In such embodiments, the item of personal information data is combined with a secret key prior to hashing. In some embodiments, the secret key can be split into an inner key and an outer key. The item of personal information data is combined with the inner key to produce an intermediate hash value in a first pass of the hash algorithm. The intermediate hash value is then combined with the outer key to produce a final hash value in a second pass of the hash algorithm. The secret key can be negotiated by the client application 210 and the contact discovery service 230 utilizing any well-known key exchange protocol.

In some embodiments, the hash value does not need to be truncated. For example, if a custom hash algorithm is utilized to generate the hash value of the item of personal information data, then the hash value is generated with the correct number of bits (e.g., N bits) tailored to provide the expected number of collisions within a specific range. In such embodiments, the hash value generated in the third step 430 of flow 400 can be utilized within the first step 510 of the flow 500.

The second step 520 of the flow 500 includes the client application 210 generating the request, which includes an identifier (e.g., a UUID) for the CIR and a key value (e.g., a truncated portion of the hash value) corresponding to the CIR. It will be appreciated that the key value is the only information related in any way to the personal information data included in the address book, and has been obfuscated to the point where the expected number of contacts that match any given key can be greater than one. The service 220 or contact discovery service 230, even with knowledge of the key, is not able to definitively match the personal information data in an address book of the client device 120 to contact information stored in the database 240. Even if the key matches only a single entry in the database 240, that entry may not be a match to the contact stored in the address book of the client device 120. Consequently, the personal information data stored in the address book of the client device remains private and confidential. Only once the client application 210 has discovered a match between a contact in the address book and a potential contact in the database 240 will the client application 210 be able to provide the information for the user account for the contact to the service 220. At that point, sharing such personal information data between the client application 210 and the service 220 is allowable because the user for that user account has explicitly opted-in to allow said information to be shared with the service 220.

In some embodiments, the client application 210 transmits the request with the {identifier:key} pair to the service 220 in order to determine if a corresponding contact in the address book of the client device 120 matches the information related to a user account that has registered with the service 220 and opted-in to be discoverable to other users. The service 220 forwards the request to the contact discovery service 230, which reads the key from the request and queries the database 240 to retrieve any entries associated with that particular key. The database 240 returns zero or more entries to the contact discovery service 230, which generates a response to send to the client application 210 for each of the zero or more entries.

In some embodiments, the contact discovery service 230 reads a number of parameters associated with a potential contact from the entry returned from the database 240. The parameters include a user identifier for the user account for the potential contact and a hash value based on an item of personal information data of the potential contact. The parameters can also include a name for the potential contact, an identifier for a user account of the potential contact, a thumbnail image for the potential contact, a URL that specifies a location for an image for the potential contact, a URL that specifies a location for a social media profile for the potential contact, and any other information that may be associated with the potential contact. In other embodiments, the contact discovery service 230 can read at least some of the parameters from one or more separate and distinct databases for storing the parameters. The entries in the database 240 can include a key for corresponding entries in the separate and distinct databases storing the related parameters. For example, the user identifier for the user account can be utilized as a key to access the parameters in the separate and distinct databases.

The contact discovery service 230 generates a payload for delivery in the response to the request. The payload can include one or more of the parameters related to the potential contact. In some embodiments, the payload comprises a data structure having a number of fields, each field including a label for the field and a value for the field. The payload can be structured as an extensible markup language (XML) document, a JavaScript Object Notation (JSON) document, or the like. For example, the payload can be formatted as a JSON document such as:

{"accountID":"12345", "name":"Doe, John", "thumbnail": "http://a.b.c/images/user12345.jpg" }

The contact discovery service 230 takes the payload and encrypts the payload utilizing an encryption key derived from an item of personal information data associated with the potential contact. The encryption key can be generated by utilizing a secure hash algorithm to generate a hash value based on the item of personal information data. The secure hash algorithm utilized to generate the encryption key can be the same algorithm or a different algorithm as the algorithm that was utilized to generate the key value used to index the entry in the database 240. In some embodiments, the contact discovery service 230 utilizes an AES-256 encryption algorithm to encrypt the payload. Again, the hash value derived from the personal information data for the potential contact can be included in the entry for the potential contact in the database 240. In some embodiments, the encrypted payload can be pre-defined and the encrypted payload can be stored in the entry of the database 240 such that the contact discovery service 230 merely reads the encrypted payload returned from the query of the database 240 and the payload is not constructed and encrypted on demand by the contact discovery service 230.

In some embodiments, the encryption key is selected from a portion of the hash value derived from the item of personal information data. For example, if the SHA-256 secure hash function is utilized to generate the hash value, then the hash value has 256-bits of information. However, the encryption key may be smaller than the 256 bits of the hash value. For example, the AES-128 encryption algorithm requires a 128-bit encryption key. In such embodiments, the contact discovery service 230 can be configured to select a portion of the hash value as the encryption key (e.g., the 128 MSBs of the 256 bit hash value).

The identifier from the request and the encrypted payload are packaged together into a response and transmitted from the contact discovery service 230 to the service 220, which forwards the response to the client application 210.

Responsive to receiving a response, the client application 210 reads the identifier included in the response. The identifier references a particular CIR, which includes a hash value for personal information data for a contact of the address book. The client application 210 attempts to decrypt the encrypted payload utilizing the hash value from the CIR corresponding to the identifier as the encryption key. If the hash value in the CIR created by the client application 210 and related to a contact in the address book of the client device 120 matches the hash value utilized to encrypt the payload by the contact discovery service 230, then the encrypted payload can be successfully decrypted, which indicates the contact in the address book matches a potential contact that has registered a user account with the service 220 and opted-in to be discoverable to other users. The client application 210 can determine whether the encrypted payload is successfully decrypted by parsing the decrypted data. Since each payload is structured according to a recognizable format, the decrypted data should include particular strings of characters within the decrypted data. In some embodiments, if the decrypted data is recognized as properly formatted JSON data, then the client application 210 determines that the potential contact included in the database 240 matches the contact in the address book. The client application 210 can then identify the potential contact information from the decrypted payload as a user account that has an established relationship with the user of the client device 120, based on the inclusion of the potential contact's personal information data in the address book of the client device 120.

Figure 6:
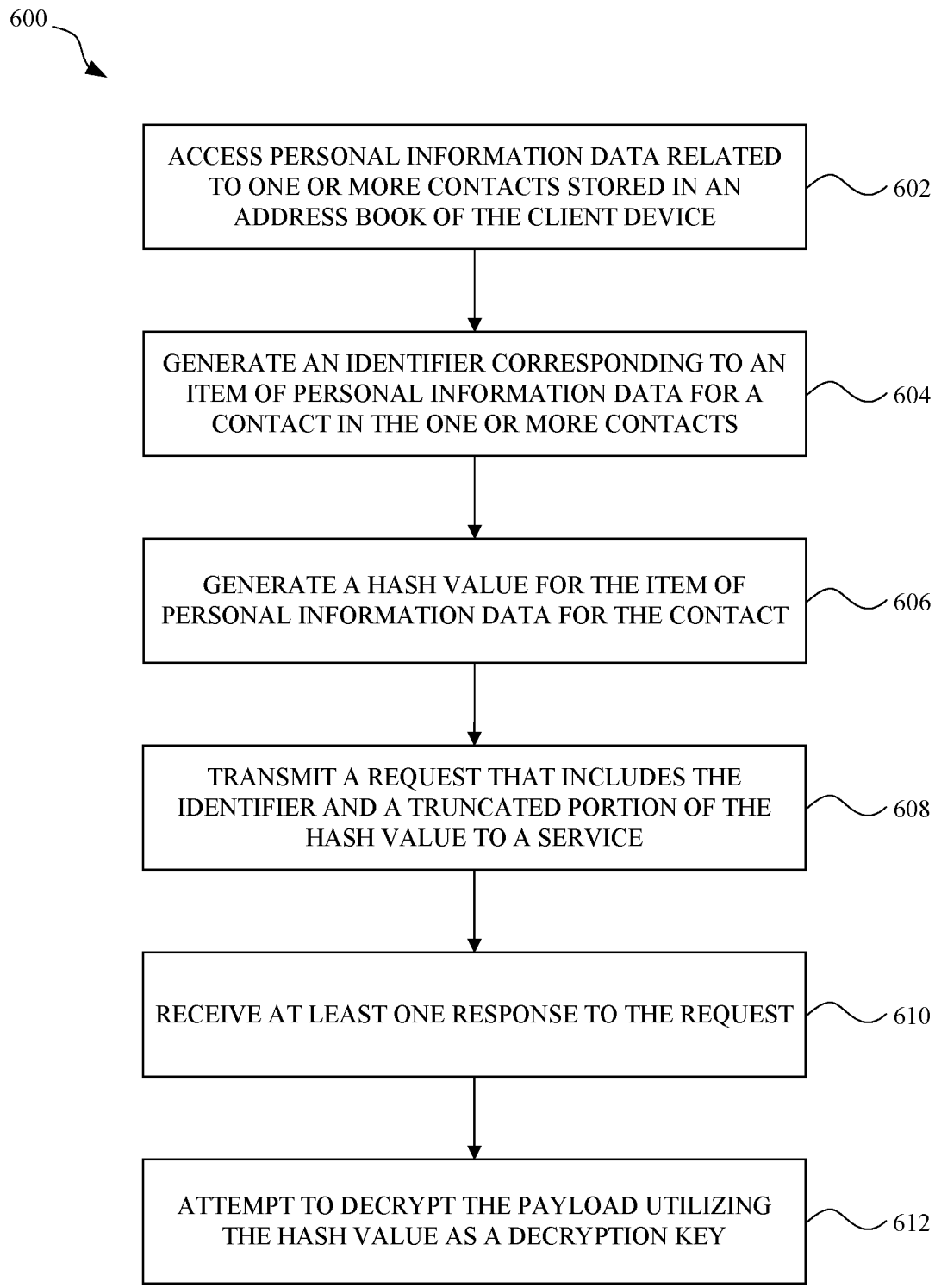
FIG. 6 is a flow chart of a method for implementing the discovery protocol, in accordance with some embodiments.

FIG. 6 is a flow chart of a method 600 for implementing the discovery protocol 200, in accordance with some embodiments. The method 600 is carried out, at least in part, by a client device 120. The method 600 can be implemented by software, hardware, or a combination of software and hardware. In some embodiments, the method 600 is implemented by the client application 210.

At 602, personal information data related to one or more contacts stored in an address book of a client device is accessed. In some embodiments, a client application 210 prompts a user to opt-in to grant the client application 210 access to an address book stored in the client device. The address book includes personal information data, including at least phone numbers and/or email addresses, for one or more contacts known to a user of the client device. It will be appreciated that the user of the client device 120 can restrict access to the address book by the client application 210 at any time by changing a user preference in settings of the client device 120 to opt-out to deny the client application 210 access to the address book. If the user has restricted access to the address book, the method 600 can terminate.

At 604, an identifier is generated that corresponds with an item of personal information data for a contact in the one or more contacts stored in the address book. In some embodiments, the identifier is a universally unique identifier (UUID) generated based on RFC 4122. The identifier is utilized by the client application 210 to track a request sent to a contact discovery service 230 to identify whether any user accounts registered with a service might be related to the contact included in the address book.

At 606, a hash value is generated for the item of personal information data for the contact. In some embodiments, the item of personal information data parsed from the address book is normalized and hashed according to a secure hash algorithm such as SHA-256. The hash value is Mbits long.

At 608, a request that includes the identifier and a truncated portion of the hash value is transmitted to a service. In some embodiments, the truncated portion of the hash value comprises the N most significant bits of the hash value, where N is less than M.

At 610, at least one response to the request is received. In some embodiments, the contact discovery service 230 generates a separate response for each potential contact that is associated with a hash value having N most significant bits that match the truncated portion of the hash value in the request. Each response includes the identifier of the request and a payload that has been encrypted utilizing the hash value associated with a potential contact as an encryption key.

At 612, an attempt to decrypt the payload is performed utilizing the hash value as a decryption key. If the hash value known to the client device is the same as the hash value associated with the potential contact, then the payload can be decrypted successfully, and the decrypted version of the payload will include information associated with a user account for the potential contact in a recognized format. However, if the hash values do not match, then the payload cannot be decrypted, and the payload is discarded.

Figure 7:
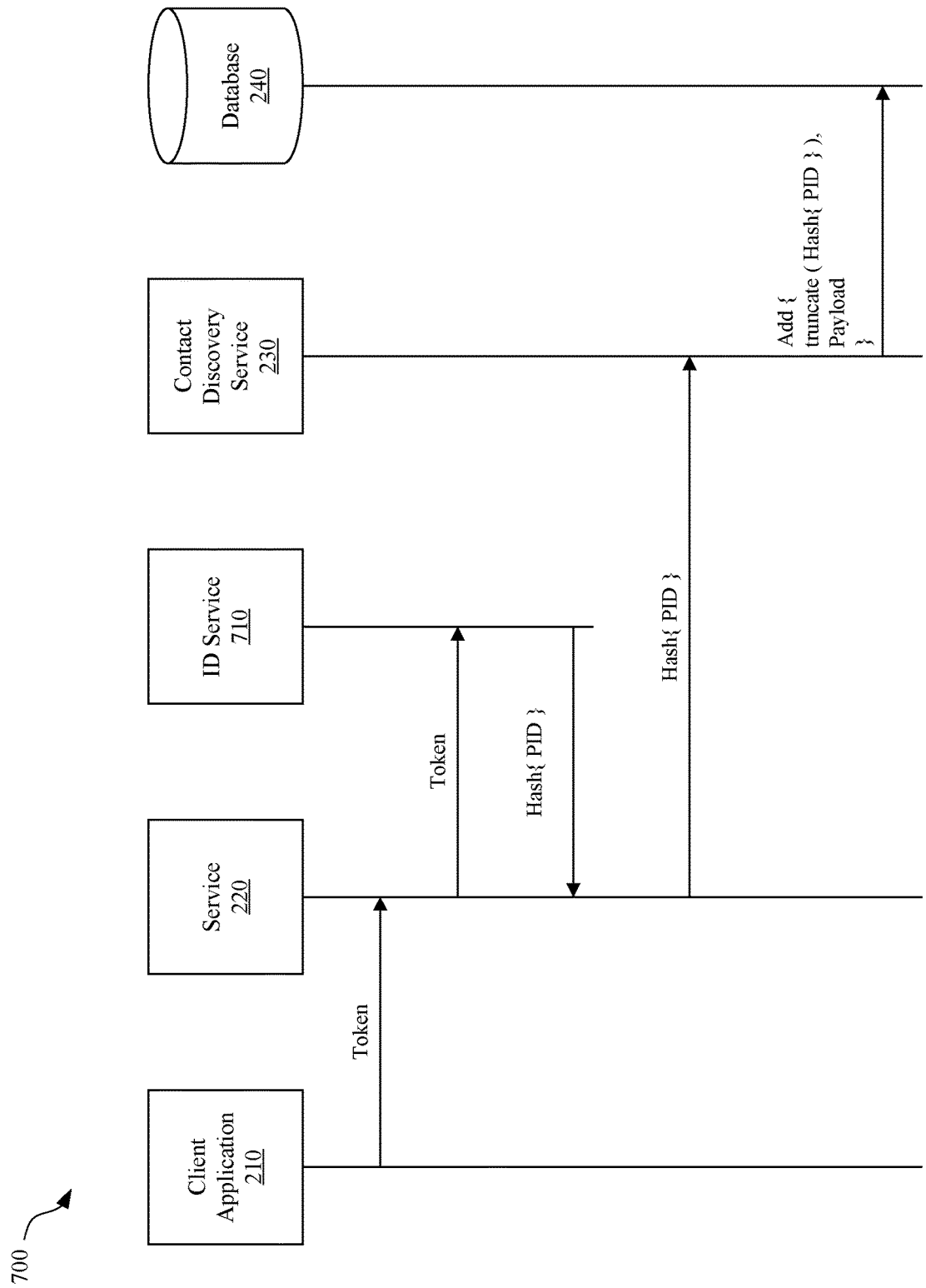
FIG. 7 illustrates a protocol to register a user account as discoverable with a service, in accordance with some embodiments.

FIG. 7 illustrates a protocol 700 to register a user account as discoverable with a service 220, in accordance with some embodiments. The protocol 700 is implemented by a number of software components. In some embodiments, the software components can include one or more of the client application 210, the service 220, an identification service 710, the contact discovery service 230, and the database 240. The client application 210 can be included in a client device 120, while the other software components are included on one or more server devices 110.

When a user creates a user account for the service 220, the client application 210 can prompt a user to opt-in to be discoverable to other users. If the user of a client device 120 opts-in to be discoverable, then the client application 210 transmits a token to the service 220 in a request to register the user account as discoverable to other users. The token comprises one of a user identifier associated with the user account or a device token that identifies the client device 120, which can be associated with the user account by the service 220. The service 220 transmits a request to an ID service 710 to request a hash value for personal information data related to the user account. The request can include the token. Alternatively, the request can include a user identifier mapped to the token by the service 220.

The ID service 710 returns a hash value for each item of personal information data corresponding to a user account that matches the token. It will be appreciated that the ID service 710 can maintain the confidentiality of the personal information data and only returns a hash value of said data to the service 220. In other embodiments, the ID service 710 can return the personal information data to the service 220, which can generate the hash value by applying a secure hash algorithm to the personal information data.

The service 220 then transmits the hash value to the contact discovery service 230 to register the user account as discoverable. The contact discovery service 230 adds an entry to the database 240 for the user account utilizing a truncated portion of the hash value as a key for indexing the entry in the database 240. The record can include the user identifier for the user account and/or the full hash value for the personal information data for the user account. In some embodiments, the contact discovery service 230 generates an encrypted payload for the user account and stores the encrypted payload in the entry added to the database 240.

In some embodiments, the ID service 710 returns a single hash value for either a phone number or an email address in response to each request received from the service 220. In other embodiments, the ID service 710 returns multiple hash values for each user token received from the service 220. For example, a single user account may have a registered phone number and email address associated therewith. The ID service 710 can be configured to return a first hash value for the phone number and a second hash value for the email address to the service in response to the request. The service 220 forwards each hash value of the multiple hash values to the contact discovery service 230 to generate separately indexed entries in the database 240 for a particular contact.

In some embodiments, as more and more user accounts are created and registered as discoverable with the service 220, the number of entries in the database 240 will expand, increasing the expected number of collisions with a query based on a truncated portion of the hash value limited to N-bits. Therefore, in certain instances, the value of N is dynamically adjusted such that the expected number of collisions is within a specific range. Again, the expected number of collisions can be calculated by dividing the number of entries M in the database 240 with the value of $2^N$. As M increases such that the expected number of collisions rises above a threshold value, then N can be increased to reduce the expected number of collisions for a random key. For example, in some embodiments, N should be dynamically adjusted so that the expected number of collisions is between 1 and 4. This can be accomplished by increasing N by 2 each time the number of entries in the database 240 quadruples. It will be appreciated that each time N is adjusted, each of the entries in the database 240 may need to be modified. For example, each entry may need to be indexed with a different key based on a different truncated portion of the full hash value corresponding to said entry.

In some embodiments, the size of N is increased less frequently, such as by increasing N only when the expected number of collisions is outside of the range of 1 to 16. In other words, N is only increased by increments of 4 bits instead of 2 whenever the number of entries in the database 240 increases by a multiple of 16. In yet other embodiments, the size of N is increased manually by a service provider to tailor the performance of the contact discovery service 230. The service provider can determine the optimal value of N for a given implementation of the discovery protocol 200.

Figure 8:
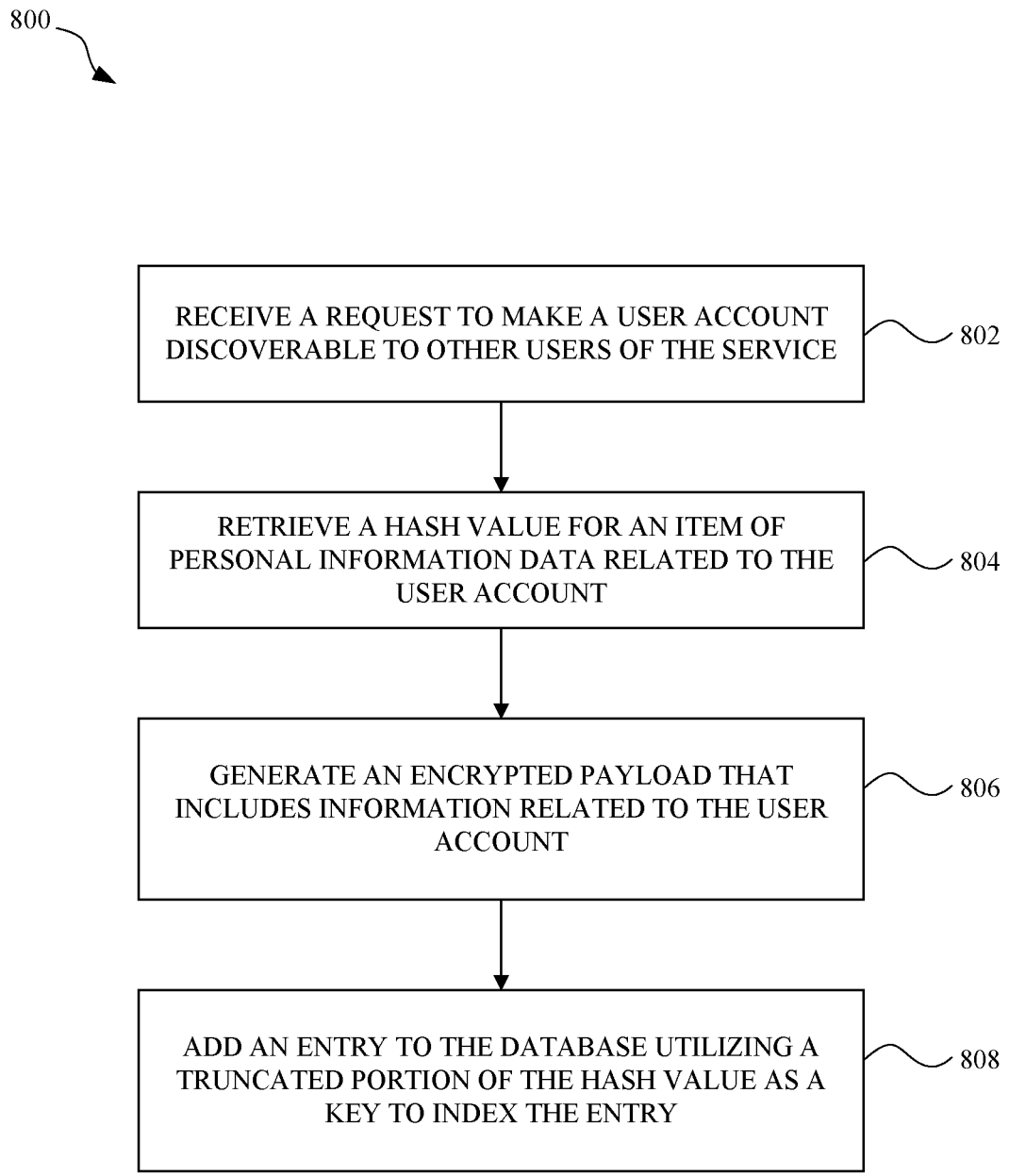
FIG. 8 is a flow chart of a method for registering a user account as discoverable, in accordance with some embodiments.

FIG. 8 is a flow chart of a method 800 for registering a user account as discoverable, in accordance with some embodiments. The method 800 is carried out, at least in part, by a server device 110. The method 800 can be implemented by software, hardware, or a combination of software and hardware. In some embodiments, the method 800 is implemented by one or more of the service 220, the ID service 710, and/or the contact discovery service 230.

At 802, a request is received to make a user account discoverable to other users of the service. In some embodiments, a service 220 receives a request from a client device 120. The request can include a token associated with the user account. The token can be a user identifier that identifies the user account or, alternately, a device token that identifies the client device 120, which has previously been associated with a particular user account.

At 804, a hash value for an item of personal information data related to the user account is retrieved. In some embodiments, the service 220 requests the hash value from an ID service 710. The request for the hash value can include the token. In some embodiments, the service 220 maps the token to a user identifier that is utilized by one or more services to identify the user account on the server-side of the client-server architecture 100. This user identifier is not shared with the client device 120. In such embodiments, the user identifier is sent to the ID service 710 rather than the token.

The item of personal information data can be stored in a data structure maintained by the ID service 710. For example, the ID service 710 can store phone numbers and/or email addresses for each user account created for the service. The personal information data can be provided to the service 220 when a user creates the user account utilizing the client application 210.

At 806, an encrypted payload is generated. The encrypted payload includes information related to the user account that is included in a data structure according to a recognized format for payloads. For example, the information can be included in fields of a JSON document. The recognized format can be a specific order, number, and type of a plurality of fields in the JSON document.

At 808, an entry is added to the database 240 utilizing a truncated portion of the hash value as a key to index the entry. At least one of user identifier for the user account, the full hash value, and/or the encrypted payload can be included in the entry such that a query of the database 240 for the truncated portion of the hash value returns the user identifier for the user account, the full hash value, and/or the encrypted payload for the user account.

Figure 9:
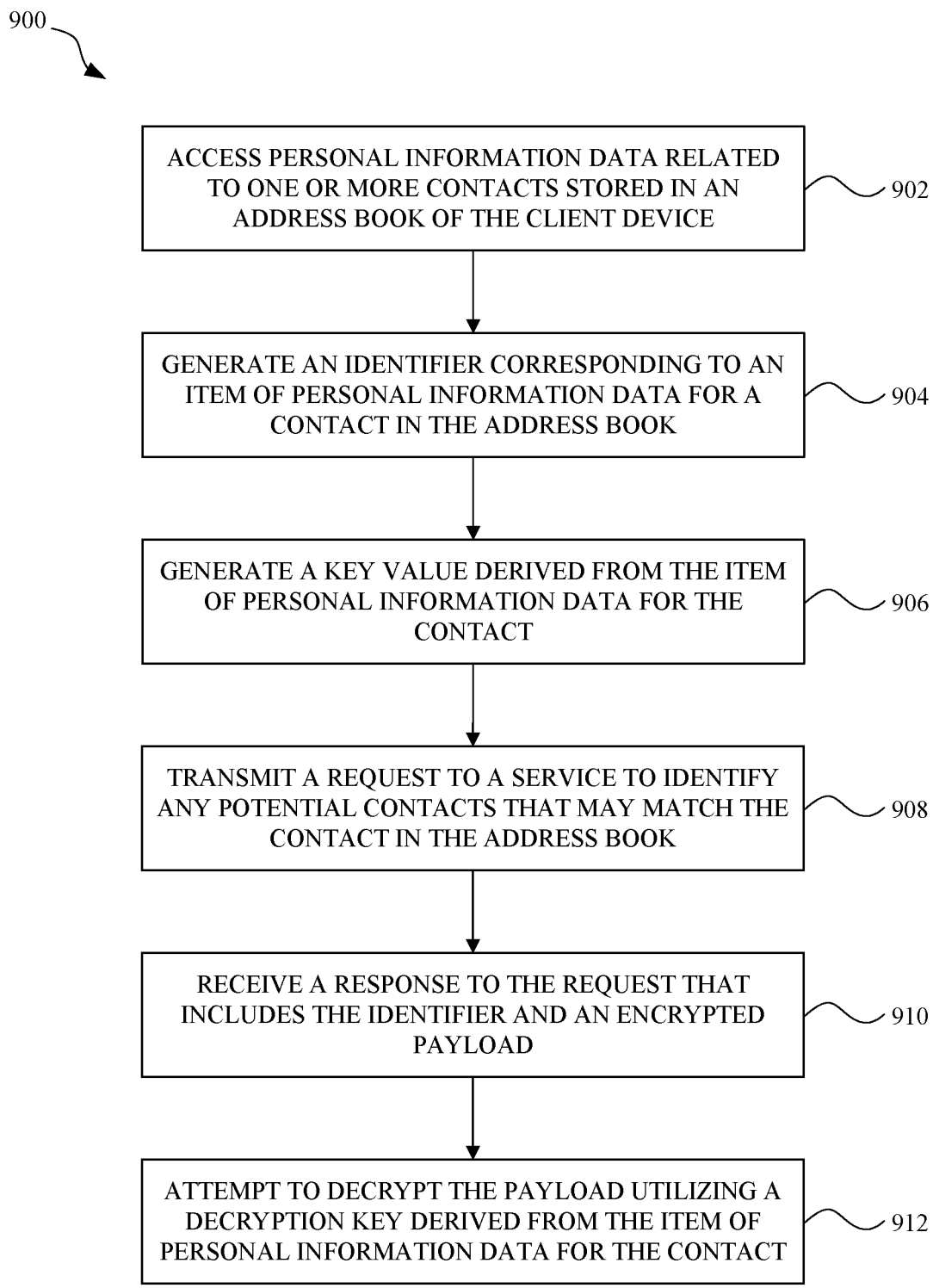
FIG. 9 is a flow chart of a method for implementing the discovery protocol, in accordance with some embodiments.

FIG. 9 is a flow chart of a method 900 for implementing the discovery protocol 200, in accordance with some embodiments. The method 900 is carried out, at least in part, by a client device 120. The method 900 can be implemented by software, hardware, or a combination of software and hardware. In some embodiments, the method 900 is implemented by the client application 210.

The method 900 is more general than the method 600 in that the hash value utilized to generate a key value for matching a contact in an address book with one or more potential contacts in the database 240 does not have to be the same hash value utilized to encrypt the payload in the response sent to the client application 210. The key value and the encryption key are merely derived from an item of personal information data that will be known to both the client device 120 and the server device 110.

At 902, personal information data related to one or more contacts stored in an address book of a client device is accessed. In some embodiments, a client application 210 prompts a user to opt-in to grant the client application 210 access to an address book stored in the client device. The address book includes personal information data, including at least phone numbers and/or email addresses, for one or more contacts known to a user of the client device. It will be appreciated that the user of the client device 120 can restrict access to the address book by the client application 210 at any time by changing a user preference in settings of the client device 120 to opt-out to deny the client application 210 access to the address book. If the user has restricted access to the address book, the method 900 can terminate.

At 904, an identifier is generated that corresponds with an item of personal information data for a contact in the address book. In some embodiments, the identifier is a universally unique identifier (UUID) generated based on RFC 4122. The identifier is utilized by the client application 210 to track a request to identify whether any user accounts registered with a service might be related to the contact included in the address book.

At 906, a key value is generated. The key value is derived from the item of PID for the contact. In some embodiments, the item of personal information data parsed from the address book is normalized and hashed according to a secure hash algorithm such as SHA-256. The hash value is M bits long, which is then truncated to the N most significant bits of the hash value. In other embodiments, the item of personal information data parsed from the address book is normalized and hashed according to a custom hash algorithm that generates a hash value of N bits. The hash value is then used directly as the key value in the request.

At 908, a request is transmitted to a service to identify any potential contacts registered with the service that may match the contact in the address book. The request includes the identifier and the key value.

At 910, a response to the request is received from the service. In some embodiments, the contact discovery service 230 generates a response for any potential contacts that are associated with the key value included in the request. A separate response for each potential contact can be generated by the contact discovery service 230 if multiple potential contacts match the key value. Each response includes the identifier of the request and a payload that has been encrypted utilizing an encryption key derived from an item of personal information data associated with a potential contact.

At 912, an attempt to decrypt the payload is performed utilizing a decryption key derived from the item of personal information data for the contact in the address book. In some embodiments, the decryption key is derived by hashing the item of personal information data associated with the contact in the address book. The hash algorithm utilized to generate the decryption key can be the same as or different from the hash algorithm utilized to generate the key value included in the request. In some embodiments, the hash value generated by the hash algorithm can be truncated to match a length required by a decryption algorithm (e.g., a 256-bit hash value can be truncated to match a 128-bit encryption/decryption algorithm such as AES-128).

If the decryption key derived by the client device is the same as the encryption key associated with the potential contact, then the payload can be decrypted successfully, and the decrypted version of the payload will include information associated with a user account for the potential contact in a recognized format. However, if the decryption key does not match the encryption key, then the payload cannot be decrypted, and the payload is discarded.

Figure 10:
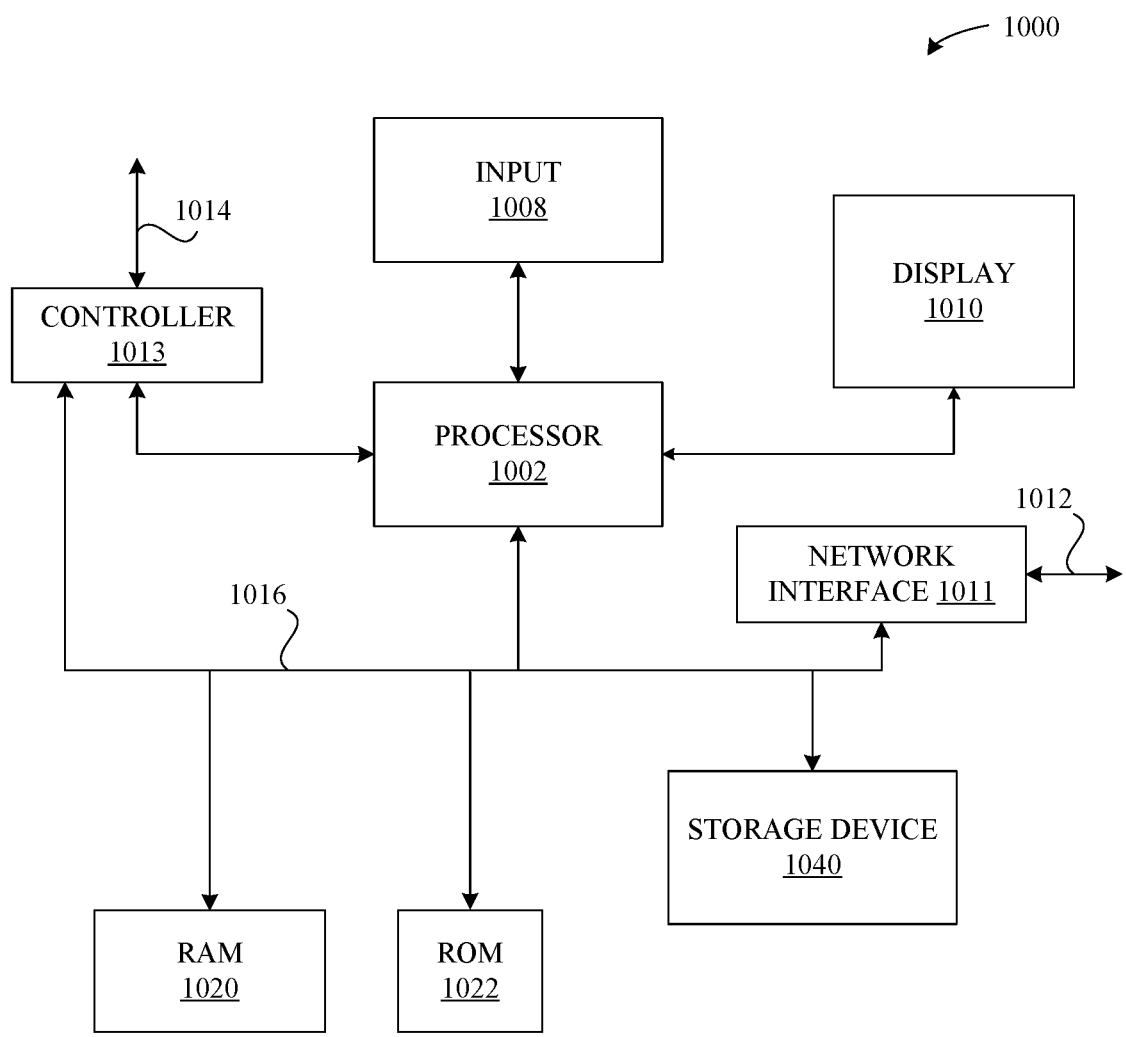
FIG. 10 illustrates a detailed view of an exemplary computing device that can be used to implement the various apparatus and/or methods described herein, in accordance with some embodiments.

FIG. 10 illustrates a detailed view of an exemplary computing device 1000 that can be used to implement the various apparatus and/or methods described herein, in accordance with some embodiments. In particular, the detailed view illustrates various components that can be included in the computing devices illustrated in FIGS. 1 and 3 and/or described herein. For example, one or more of the server devices(s) 110, client device(s) 120, or any other device including any network devices and/or consumer electronics can include the components of computing device 1000.

As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to present visual information to the user. A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include a wireless transceiver.

The computing device 1000 also include a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

As described above, one aspect of the present technology is the gathering and use of data available from various sources to improve the social aspects of an application. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify other user accounts for individuals that have an existing relationship with a given user. Accordingly, use of such personal information data enables discovery of these pre-existing relationships. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of contact discovery services, the present technology can be configured to allow users to select to "opt in" or "opt out" of participation in the collection of personal information data during registration for services or anytime thereafter. In another example, users can select not to provide access to an address book for discovering contacts known to a user. In yet another example, users can select to limit the length of time access to the address book is granted or entirely prohibit access to the address book. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information. The services may simply operate without incorporating such social aspects as described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for implementing a discovery protocol that includes privacy aspects, the method comprising, by a server device:
   receiving, from a client device, a request that includes an identifier and a key value, wherein:
      the identifier is generated and stored by the client device in conjunction with the client device seeking to determine, based on a first item of personal information data (PID) for a contact of one or more contacts known to the client device, whether the contact is known to the server device, and
      the key value is derived from the first item of PID for the contact;
   generating a payload that has been encrypted utilizing an encryption key derived from a second item of PID for a potential contact; and
   providing, to the client device, a response that includes the payload and the identifier.

2. The method of claim 1, wherein, when the client device determines that the identifier generated by the client device matches the identifier included in the response, the client device attempts to decrypt the payload utilizing a decryption key derived from the second item of PID for the contact.

3. The method of claim 2, wherein:
   when the payload can be decrypted, then the contact matches the potential contact and a decrypted version of the payload includes information associated with a user account for the potential contact in a recognized format, and
   when the payload cannot be decrypted, then the contact does not match the potential contact and the response is discarded.

4. The method of claim 1, wherein:
   the first item of PID comprises a phone number or an email address associated with the contact, and
   the second item of PID comprises a phone number or an email address associated with the potential contact.

5. The method of claim 1, wherein the key value is generated by:
   hashing the first item of PID utilizing a hash algorithm to generate a hash value; and
   producing a truncated hash value by truncating the hash value to select N most significant bits of the hash value as the key value.

6. The method of claim 5, wherein a number of bits included in the truncated hash value is adjusted dynamically based on a total number of potential contacts registered with the server device.

7. The method of claim 1, wherein the server device maintains a distributed database that includes key-value pairs that associate each key value with zero or more potential contacts registered with the server device.

8. A non-transitory computer readable storage medium configured to store instructions that, when executed by at least one hardware processor included in a server device, cause the server device to implement a discovery protocol that includes privacy aspects, by carrying out steps that include:
   receiving, from a client device, a request that includes an identifier and a key value, wherein:
      the identifier is generated and stored by the client device in conjunction with the client device seeking to determine, based on a first item of personal information data (PID) for a contact of one or more contacts known to the client device, whether the contact is known to the server device, and the key value is derived from the first item of PID for the contact;

generating a payload that has been encrypted utilizing an encryption key derived from a second item of PID for a potential contact; and providing, to the client device, a response that includes the payload and the identifier.

9. The non-transitory computer readable storage medium of claim 8, wherein, when the client device determines that the identifier generated by the client device matches the identifier included in the response, the client device attempts to decrypt the payload utilizing a decryption key derived from the second item of PID for the contact.

10. The non-transitory computer readable storage medium of claim 9, wherein:

when the payload can be decrypted, then the contact matches the potential contact and a decrypted version of the payload includes information associated with a user account for the potential contact in a recognized format, and when the payload cannot be decrypted, then the contact does not match the potential contact and the response is discarded.

11. The non-transitory computer readable storage medium of claim 8, wherein:

the first item of PID comprises a phone number or an email address associated with the contact, and the second item of PID comprises a phone number or an email address associated with the potential contact.

12. The non-transitory computer readable storage medium of claim 8, wherein the key value is generated by:

hashing the first item of PID utilizing a hash algorithm to generate a hash value; and producing a truncated hash value by truncating the hash value to select N most significant bits of the hash value as the key value.

13. The non-transitory computer readable storage medium of claim 12, wherein a number of bits included in the truncated hash value is adjusted dynamically based on a total number of potential contacts registered with the server device.

14. The non-transitory computer readable storage medium of claim 8, wherein the server device maintains a distributed database that includes key-value pairs that associate each key value with zero or more potential contacts registered with the server device.

15. A server device configured to implement a discovery protocol that includes privacy aspects, the server device comprising at least one hardware processor configured to cause the server device to carry out steps that include:

receiving, from a client device, a request that includes an identifier and a key value, wherein:

the identifier is generated and stored by the client device in conjunction with the client device seeking to determine, based on a first item of personal information data (PID) for a contact of one or more contacts known to the client device, whether the contact is known to the server device, and the key value is derived from the first item of PID for the contact;

generating a payload that has been encrypted utilizing an encryption key derived from a second item of PID for a potential contact; and providing, to the client device, a response that includes the payload and the identifier.

16. The server device of claim 15, wherein, when the client device determines that the identifier generated by the client device matches the identifier included in the response, the client device attempts to decrypt the payload utilizing a decryption key derived from the second item of PID for the contact.

17. The server device of claim 16, wherein:

when the payload can be decrypted, then the contact matches the potential contact and a decrypted version of the payload includes information associated with a user account for the potential contact in a recognized format, and when the payload cannot be decrypted, then the contact does not match the potential contact and the response is discarded.

18. The server device of claim 15, wherein:

the first item of PID comprises a phone number or an email address associated with the contact, and the second item of PID comprises a phone number or an email address associated with the potential contact.

19. The server device of claim 15, wherein the key value is generated by:

hashing the first item of PID utilizing a hash algorithm to generate a hash value; and producing a truncated hash value by truncating the hash value to select N most significant bits of the hash value as the key value.

20. The server device of claim 19, wherein a number of bits included in the truncated hash value is adjusted dynamically based on a total number of potential contacts registered with the server device.

\* \* \* \* \*

UNITED STATES PATENT AND TRADEMARK OFFICE
CERTIFICATE OF CORRECTION

PATENT NO. : 11,921,883 B2
APPLICATION NO. : 17/202263
DATED : March 5, 2024
INVENTOR(S) : Thomas Alsina et al.

It is certified that error appears in the above-identified patent and that said Letters Patent is hereby corrected as shown below:

In the Specification

At Column 13, Line 8: "0xEA39F7F7-F02F-4FE3-9A2C-051E1B25EC37" should read
-- 0xEA39F7F7-F02F-4FE3-9A2C-C51E1B25EC37 --.

At Column 17, Line 38: "algorithm such as SHA-256. The hash value is Mbits long." should read
-- algorithm such as SHA-256. The hash value is M bits long. --.

At Column 17, Line 43: "value, where Nis less than M." should read -- value, where N is less than M. --.

Signed and Sealed this
Twenty-second Day of October, 2024

Katherine Kelly Vidal
*Director of the United States Patent and Trademark Office*